(12) United States Patent
Manber et al.

(10) Patent No.: US 7,496,560 B2
(45) Date of Patent: Feb. 24, 2009

(54) PERSONALIZED SEARCHABLE LIBRARY WITH HIGHLIGHTING CAPABILITIES

(75) Inventors: Udi Manber, Palo Alto, CA (US); Hilliard Siegel, Seattle, WA (US); Charles Gordon, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 338 days.

(21) Appl. No.: 10/669,088

(22) Filed: Sep. 23, 2003

(65) Prior Publication Data

US 2005/0076012 A1 Apr. 7, 2005

(51) Int. Cl.
*G06F 17/00* (2006.01)
*G06F 17/30* (2006.01)

(52) U.S. Cl. ............... 707/3; 707/102; 707/200; 715/272

(58) Field of Classification Search ............ 707/1–10, 707/100–102, 104.1, 200–201; 709/217, 709/224, 203; 715/500.1, 512, 272
See application file for complete search history.

(56) References Cited

U.S. PATENT DOCUMENTS

| | | | |
|---|---|---|---|
| 5,623,681 A | | 4/1997 | Rivette |
| 5,761,485 A | | 6/1998 | Munyan |
| 5,809,318 A | * | 9/1998 | Rivette et al. ............ 715/512 |
| 5,821,929 A | | 10/1998 | Shimizu |
| 5,857,203 A | * | 1/1999 | Kauffman et al. ......... 707/200 |
| 5,957,697 A | | 9/1999 | Iggulden et al. |
| 5,960,448 A | * | 9/1999 | Reichek et al. ........... 715/526 |
| 5,963,916 A | * | 10/1999 | Kaplan ..................... 705/26 |
| 5,995,978 A | * | 11/1999 | Cullen et al. ............. 707/104.1 |
| 6,043,823 A | | 3/2000 | Kodaira |
| 6,331,865 B1 | | 12/2001 | Sachs et al. |
| 6,353,831 B1 | | 3/2002 | Gustman |
| 6,373,992 B1 | * | 4/2002 | Nagao ..................... 382/266 |
| 6,385,614 B1 | | 5/2002 | Vellandi |
| 6,397,213 B1 | * | 5/2002 | Cullen et al. ............... 707/5 |

(Continued)

OTHER PUBLICATIONS

Milliot, J., "Publishers Grudgingly Cooperative With Amazon Database Effort," *Publishers Weekly*, Sep. 15, 2003 <http://publishersweekly.reviewnews.com/index.asp?layout=articlePrint&articleID=CA322659> [retrieved Sep. 15, 2003].

(Continued)

*Primary Examiner*—Miranda Le
(74) *Attorney, Agent, or Firm*—Christensen O'Connor Johnson Kindness PLLC

(57) ABSTRACT

A system and method for preparing and searching a user-personalized library of content includes preparing a general library comprised of images of pages of content and electronically-searchable text corresponding to the text in the page images, which is then personalized by receiving from the user a selection of the content to include in the user's personalized library. User selection of content for a personalized library may be accomplished manually or automatically as a result of user actions, such as user review or purchase of content. Preferably, full text searching of the content in the user's personalized library is enabled. Page images in the personalized library containing text that match the user's search terms are provided to the user for display. Highlighting of search terms in page images by a user device and access rules that act to limit the viewing of content are further provided.

39 Claims, 12 Drawing Sheets

U.S. PATENT DOCUMENTS

| | | | |
|---|---|---|---|
| 6,442,576 B1* | 8/2002 | Edelman et al. | 715/513 |
| 6,449,627 B1* | 9/2002 | Baer et al. | 715/514 |
| 6,449,636 B1 | 9/2002 | Kredo et al. | |
| 6,522,782 B2* | 2/2003 | Pass et al. | 382/218 |
| 6,532,461 B2* | 3/2003 | Evans | 707/3 |
| 6,556,704 B1* | 4/2003 | Chen | 382/154 |
| 6,562,077 B2 | 5/2003 | Bobrow et al. | |
| 6,594,646 B1 | 7/2003 | Okayama et al. | |
| 6,609,105 B2 | 8/2003 | Van Zoest et al. | |
| 6,633,742 B1* | 10/2003 | Turner et al. | 434/350 |
| 6,694,331 B2* | 2/2004 | Lee | 707/104.1 |
| 6,701,350 B1 | 3/2004 | Mitchell | |
| 6,721,729 B2* | 4/2004 | Nguyen et al. | 707/3 |
| 6,782,144 B2 | 8/2004 | Bellavita | |
| 6,802,000 B1 | 10/2004 | Greene et al. | |
| 6,809,741 B1 | 10/2004 | Bates et al. | |
| 6,915,294 B1* | 7/2005 | Singh et al. | 707/3 |
| 6,925,444 B1* | 8/2005 | McCollom et al. | 705/14 |
| 6,961,905 B1 | 11/2005 | Cover et al. | |
| 6,968,332 B1* | 11/2005 | Milic-Frayling et al. | 707/3 |
| 6,981,905 B2* | 1/2006 | Yakou et al. | 445/24 |
| 7,007,034 B1* | 2/2006 | Hartman et al. | 707/102 |
| 7,020,663 B2 | 3/2006 | Hay | |
| 7,137,064 B2* | 11/2006 | Kuppinger et al. | 715/507 |
| 7,149,353 B2 | 12/2006 | Siegel | |
| 2001/0007980 A1* | 7/2001 | Ishibashi et al. | 705/26 |
| 2001/0012400 A1* | 8/2001 | Wang et al. | 382/181 |
| 2002/0082922 A1 | 6/2002 | Van Zoest | |
| 2002/0156740 A1* | 10/2002 | Kasahara et al. | 705/52 |
| 2003/0012399 A1 | 1/2003 | Wu | |
| 2003/0016855 A1* | 1/2003 | Shinbata | 382/132 |
| 2003/0061101 A1* | 3/2003 | Seet et al. | 705/14 |
| 2003/0093312 A1* | 5/2003 | Ukita et al. | 705/10 |
| 2003/0093382 A1* | 5/2003 | Himeno et al. | 705/51 |
| 2003/0126267 A1 | 7/2003 | Gutta | |
| 2004/0122811 A1 | 6/2004 | Page | |
| 2004/0137820 A1* | 7/2004 | Yakou et al. | 445/24 |
| 2004/0205466 A1* | 10/2004 | Kuppinger et al. | 715/500 |
| 2004/0205546 A1* | 10/2004 | Blumberg | 715/512 |
| 2004/0205632 A1* | 10/2004 | Li | 705/526 |
| 2005/0063612 A1 | 3/2005 | Manber | |
| 2005/0096938 A1 | 5/2005 | Slomkowski | |

OTHER PUBLICATIONS

"Amazon Plans Book-Text Seach," CNN Money, Jul. 21, 2003 <http://money.cnn.com/2003/07/21/technology/amazon.reut/?cnn=yes>.

"Amazon Working on Book Search Database-NYTimes," *Reuters, Yahoo!Finance*, Jul. 21, 2003 <http://bix.yahoo.com/rc/030721/tech_amazon_database_1.html>.

"Amazon Plan Would Allow Searching Texts of Many Books," *techdirt*, Jul. 21, 2003 <http://www.techdirt.com/articles/20030721/019252_F.shtml>.

"Amazon Plan Would Allow Searching Texts Of Many Books," New York Times Full Feed, Jul. 21, 2003 <http://www.hostingtech.com/news/2003/7/22>.

Consumer ReportsTM, Archive Website www.consumerreports.org, Archived on Dec. 2, 2000 by The Wayback Machine at www.archive.org, pages numbered as page Nos. 1-16.

Phelps, T.A., and R. Wilensky, "Multivalent Documents," Communications of the ACM (Association for Computing Machinery) 43(6):83-90, Jun. 2000.

Witten, I.H., et al., "Compression and Full-Text Indexing for Digital Libraries," Lecture Notes in Computer Science, Springer Verlag, Berlin, Germany, vol. 916, May 19, 1994, pp. 181-201.

Witten, I.H., et al., "Greenstone: Open-Source Digital Library Software With End-User Collection Building," Online Information Review, MCB University Press, UK, 25(5):288-297, 2001, <http://www.cs.waikato.ac.nz/{ihw/papers/01  IHW-DB-SB-Greenstoneopen.pdf> [retrieved June 26, 2007].

"Look Ahead Filtering of Internet Content," IBM Technical Disclosure Bulletin XP-000754118, vol. 40, No. 12, Dec. 1997.

\* cited by examiner

PERSONALIZED SEARCHABLE LIBRARY WITH HIGHLIGHTING CAPABILITIES

CROSS-REFERENCE TO RELATED APPLICATION

This application is related to U.S. Pat. No. 7,149,353, titled "METHOD AND SYSTEM FOR SUPPRESSION OF FEATURES IN DIGITAL IMAGES OF CONTENT," filed concurrently herewith and incorporated herein by reference.

FIELD OF THE INVENTION

The present invention is directed to systems and methods of selecting and searching content in an electronic library of content.

BACKGROUND OF THE INVENTION

The information age has produced an explosion of content for people to read. This content includes traditional media such as books, magazines, newspapers, newsletters, manuals, guides, references, articles, reports, documents, etc. that exist in print, as well as electronic media in which the aforesaid works are provided in digital form. The Internet has further enabled an even wider publication of content in the form of document downloads, such as portable document files and e-books.

Given the vast sea of content that people encounter, it is not uncommon for a person to read something and later recall a memorable phrase or subject, but not remember the exact source of the phrase or subject. The person may attempt to obtain recently read items in an effort to find the phrase or subject, but searching these items in this manner can be tedious, time consuming, and unfruitful. A person may also simply wish to research a particular subject in a set of books or other content that the person Separately, various search engines have attempted to catalogue Web pages available on the Internet. However, given the enormous amount of content published electronically on the Internet, searching the entire Internet for a phrase or subject in a particular source the reader recently read can be similar to finding a needle in a haystack. The reader may have to wade through pages and pages of search results provided by search engines, and in the end, may still be unable to locate the desired source. Moreover, the desired source may not have been published on the Internet in the first place, and thus would not be included in this type of search.

Electronic searching of public library catalogs is also known, but such searching is limited to bibliographic information and other meta-information that describe the library content. Full text searching of public library content is not available, and even if it were, the search may produce results from sources that are not of interest to the user.

What is needed is a system and method of providing a library of content that a user can personalize and search electronically, in which the location of specified search terms in the user's personalized library is reported. Desirably, images of some or all of the text, pictures, and other features surrounding the located search terms would be provided for immediate review by the user, consistent with permissions granted for providing such content to the user. The present invention addresses these needs and other shortcomings that currently exist.

SUMMARY OF THE INVENTION

The present invention provides a system and method for preparing and searching an electronically-searchable library of content that is personalized by a user. In one aspect, a method is provided whereby individual users can prepare a user-personalized library of content. This method comprises first generating a general library of content comprised of images of pages of content and electronically-searchable text corresponding to the text in the page images. The page images may be stored in a page image database while the corresponding text is stored in a text searchable database. The user prepares a personalized library of content by selecting content from the general library to include in the user's personalized library of content. The user may then search the user's personalized library for pages matching one or more search terms.

Content may be "selected" by a user and included in the user's personalized library in a variety of ways, including manual selection by the user or automatic selection based on other user activity, such as a purchase of content or selection of content for review (e.g., prior to purchase). A personalized library may be prepared for any given search or set of searches, and further may be stored for searches to be conducted in later user sessions.

One or more classes of content may be defined. Content in the user's personalized library of content may be assigned to one or more of the classes. This allows the user to organize his or her personalized library and limit a search of the personalized library to content in a specified class.

In another aspect, a method is provided for electronically searching a user-personalized library of content in which one or more search terms are received from a user having a personalized electronically-searchable library of content. Preferably, the full text of the user's personalized library is searched for pages of content that match the search terms. The results produced from this search are provided to the user, and the user is able to select one or more of the search results for further review. The method includes providing to the user an image of a page of content in the user's personalized library based on the user's selection of the search results.

The search results may be provided to the user in the form of a list of content identifying pages with text that matches the search terms. The list of content, in this regard, may be ranked according to one or more predetermined criteria prior to display to the user. Such criteria may include measures of relevance to the user.

Another aspect of the invention is a highlighting capability in which highlighting of search terms in page images provided to the user is performed by the user device operated by the user. The user is provided information that (1) identifies the location of the search terms in the page image and (2) instructs electronic application of highlight to the page image according to the location information of the search terms. Such highlighting may comprise application of a layer of color on or near the search terms, or may comprise placement of a visual indicator next to the search terms.

Yet another aspect of the present invention is an access rights database that includes access rules that act to limit the content in a page image provided to the user. For example, one or more access rules may limit the amount of content displayed to the user in a page image. Alternatively, or in addition, the access rules may define an aggregate amount of content that is provided to the user over a time frame. The access rules may also define the amount of content to be provided to the user based on content-specific information or user-specific information. For example, in circumstances where the user owns the content, a greater amount or all of the content may be provided to the user for viewing. Purchase records pertaining to the user may be reviewed to validate user ownership of the content. Moreover, different access rules may be written to apply based on the location of the user or the time at which the content is to be provided to the user.

In a further embodiment, the "user" may constitute a group of persons, such as a family, fraternity, or roommates. The personalized library of content may include content selected by the group of persons. Persons in the group are then enabled to conduct searches of the library of content personalized by the group. This aspect of the invention provides a community building feature to persons that know each other and are willing to pool their respective content in a personalized library.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
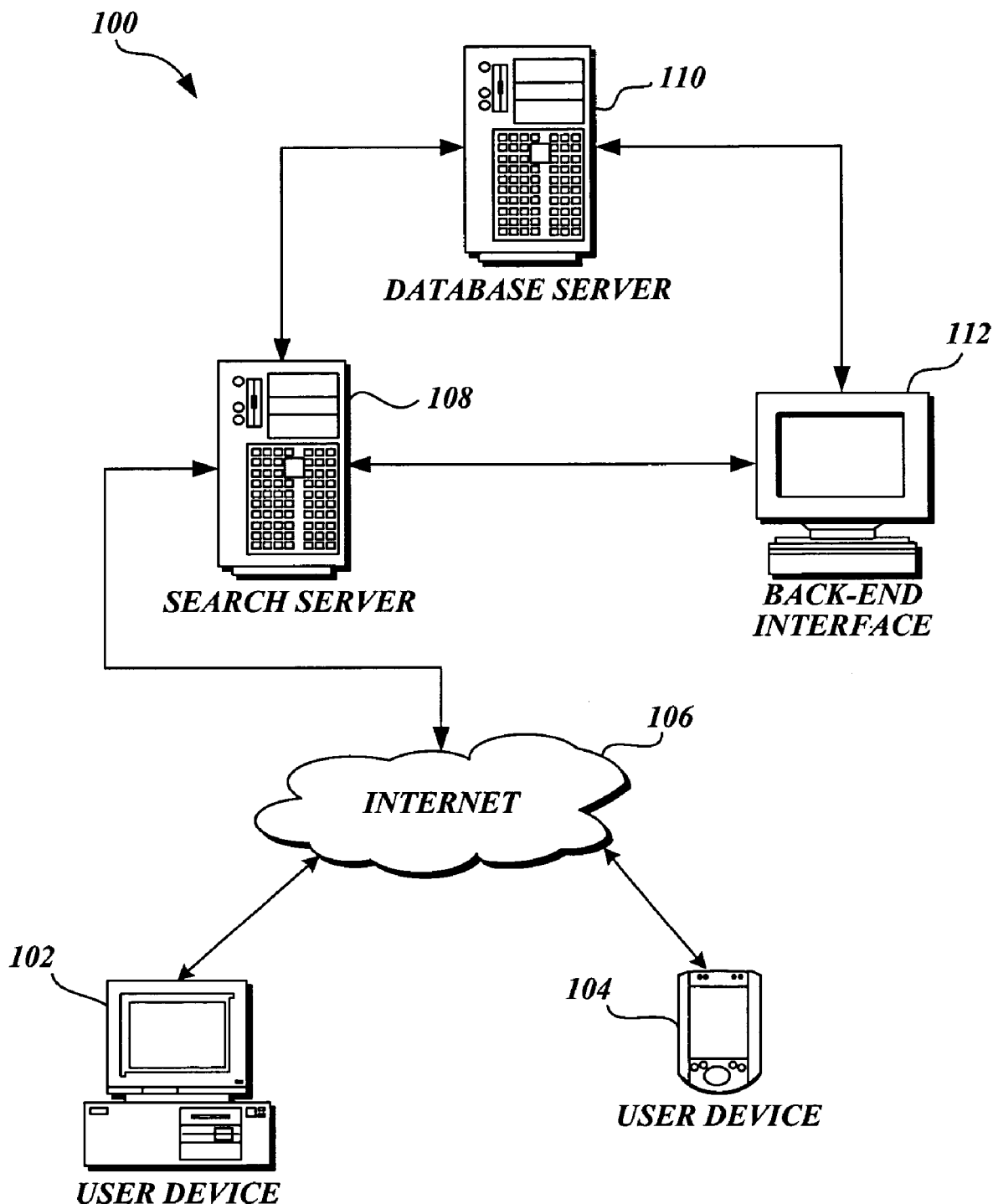
FIG. 1 is a pictorial diagram showing an environment for implementing one exemplary embodiment of the invention.

FIG. 1 illustrates one environment for implementing an embodiment of the present invention. The environment shown includes a library content search system 100 with an electronically-searchable library of content that can be personalized by multiple individual users. The environment also includes various electronic user devices, such as a computer system 102 and a PDA 104, that individual users can use to communicate with the search system 100. In the environment shown in FIG. 1, the user devices 102, 104 communicate with the search system 100 via one or more computer networks, such as the Internet 106. Protocols and components for communicating via the Internet are well known to those of ordinary skill in the art of computer network communications. Communication between user devices 102, 104 and the search system 100 may also be enabled by local wired or wireless computer network connections.

The search system 100 depicted in FIG. 1 operates in a distributed computing environment comprising several computer systems that are interconnected via communication links, e.g., using one or more computer networks or direct connections. However, it will be appreciated by those of ordinary skill in the art that the system 100 could equally operate in a computer system having fewer or greater number of components than are illustrated in FIG. 1. Thus, the depiction of the search system 100 in FIG. 1 should be taken as exemplary, and not limiting to the scope of the invention.

The search system 100 as illustrated includes a search server 108, a database server 110, and a back-end interface 112. Each of the servers 108 and 110 are described below in more detail. The back-end interface 112 allows an operator of the search system 100 to monitor and adjust the operation of the servers 108 and 110 as needed.

In brief, the search server 108 is generally responsible for providing front-end user communication with various user devices, such as devices 102 and 104, and back-end searching services in cooperation with the database server 110. The front-end communication provided by the search server 108 may include generating text and/or graphics, possibly organized as a Web page using hypertext transfer protocols, in response to information and search queries received from the various user devices 102, 104. The search server 108 also is generally responsible for conducting searches of the databases in the database server 110. The database server 110, as described below, maintains the databases that the search server 108 uses to respond to user search queries.

In one suitable implementation provided herein to illustrate an embodiment of the invention, the search system 100 enables a user to review an index that catalogs the general library of content in the databases stored in the database server 110. This general library of content may include various forms of publications, including (but not limited to) books, magazines, newspapers, newsletters, manuals, guides, references, articles, reports, documents, etc. To facilitate user review and selection of content from the general library, various metadata may be associated with the content in the general library. This metadata may include internal attributes, such as title, author, subject, abstract publisher, publication date and place, publication type, characters, etc. External attributes may also be associated with the content, such as sales popularity, user reviews, publisher promotion, related media, events, etc. The index that catalogs the general library may be organized and presented to the user according to one or more of these attributes.

In this embodiment of the invention, the user may select the content from this general index of content to be included or otherwise associated in a personalized library for the user. The content in the user's personalized library, or "personal library," is electronically-searchable in all respects, thus enabling the user to search the full text of the content for specified terms (e.g., words, phrases, graphics, charts, pictures, or other text or non-text objects). Depending on access rights and permissions granted to the user, the results of a search may include some, all, or none of the full-text content in which the specified terms are found. Images of one or more pages of content that include the search terms are delivered by the search server 108 to the user device 102, 104 for display to the user, e.g., in the form of a Web page, a portable document image, a raster-based image, a vector-based image, etc. Images of content may be stored and delivered in jpg, .gif, and/or tif formats, for example. The search terms as found in the image display may also be highlighted by the user device 102, 104 in accordance with the present invention, as described later herein.

Selection of content to include in a user's personal library can be accomplished in a variety of ways. For example, a user may manually select content from a general library of content in a manner that specifically identifies the content that the user desires to include in his or her personal library. Automated selection of content based on other user actions may also be provided. For example, each time the user selects particular content for review or for purchase, that content may be added automatically to the user's personal library. Similarly, a content review or purchase history received from one or more sources may be used to automatically add content to the user's personal library.

As will be discussed below, a personal library enables a user to define and search a particular set of content. Preferably, the user establishes a personal library prior to executing a search so that the search algorithm has a limited universe of content on which to act. In other circumstances, a personal library may be established in real time with the submission or execution of a search query or after the search has been executed on some broader library to define the scope of search results that are presented to the user.

Figure 2:
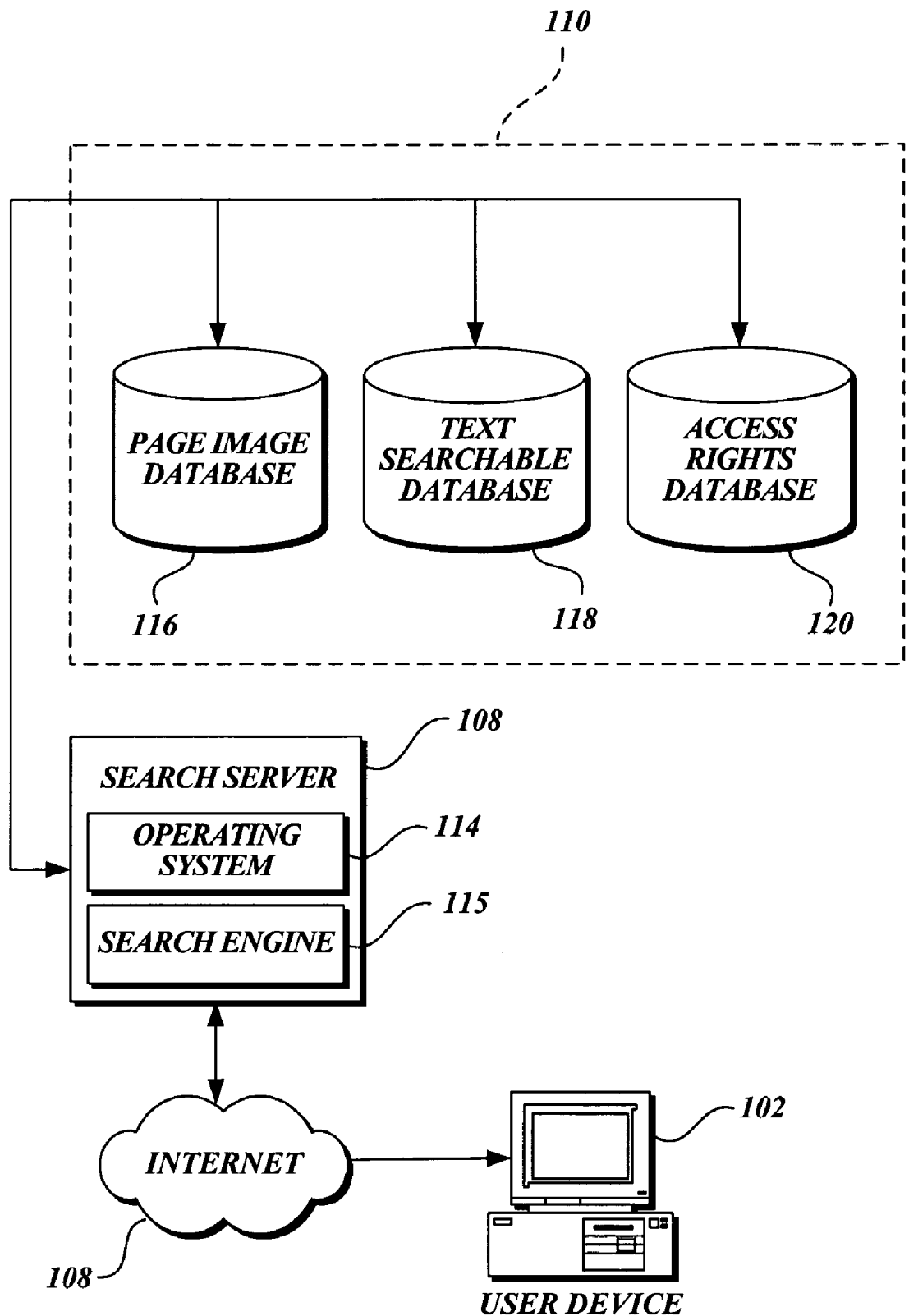
FIG. 2 is a block diagram depicting an arrangement of certain computing components for implementing the embodiment shown in FIG. 1.

FIG. 2 illustrates certain exemplary computing components that are responsible for the operation of the library content search system 100 shown in FIG. 1. The search server 108, for example, is shown including an operating system 114 that provides executable program instructions for the general administration and operation of the search server 108. The search server 108 further includes computer program instructions for implementing a search engine 115 that operates in cooperation with the database server 110 to respond to user search queries. Suitable implementations for the operating system 114 and algorithms for the search engine 115 are known or commercially available, and are readily implemented by persons having ordinary skill in the art, particularly in light of the disclosure herein.

The database server 110, as illustrated in FIG. 2, includes a page image database 116, a text searchable database 118, and an access rights database 120. The database server 110 is configured to receive search instructions from the search engine 115 and return search results from the page image database 116 and/or text searchable database 118. The access rights database 120 enables the search server 108 to control the scope and nature of the content that can be displayed to the user as a result of a search. For example, a user may be permitted to view an entire image of a page of content, such as a book, that the user already owns. For content not owned by the user, the user may be permitted to view only a selected portion of the page image located by the search, with the remaining portions of the page image being suppressed. Those of ordinary skill in the art will recognize that the search server 108 and database server 110 will typically employ a memory and main processor in which program instructions are stored and executed for operation of the servers. The database server 110 further includes executable program instructions for maintaining and updating the databases 116, 118, and 120, and responding to search instructions received from the search engine 115.

For the sake of convenience, much of the description herein is provided in the context of searching the content of books, but it should be well understood that the present invention is applicable to searching a library containing other forms of content that can be read and displayed to a user. References herein to specific types of content, such as books, magazines, newspapers, etc., are only illustrative and do not serve to limit the general application of the invention.

In one aspect, the present invention is directed to searching a library of content that is personalized by a user. A user's personalized library, or "personal library," includes only such content as selected by the user, either manually or automatically as a result of one or more user actions. In order to provide content that the user can select to include in his or her personal library, it is appropriate (though not required) to first create a general library of content. In one implementation of the invention discussed herein, libraries of content include both images of pages of content, as well as text searchable forms of the content. Page images are stored in the page image database 116, while searchable text corresponding to the page images is stored in the text searchable database 118. Further embodiments of the invention may allow a user to upload and store page images that are specific to the user's personal library. When permissible, the user may also add the uploaded content to the general library of content for selection by other users.

Figure 3:
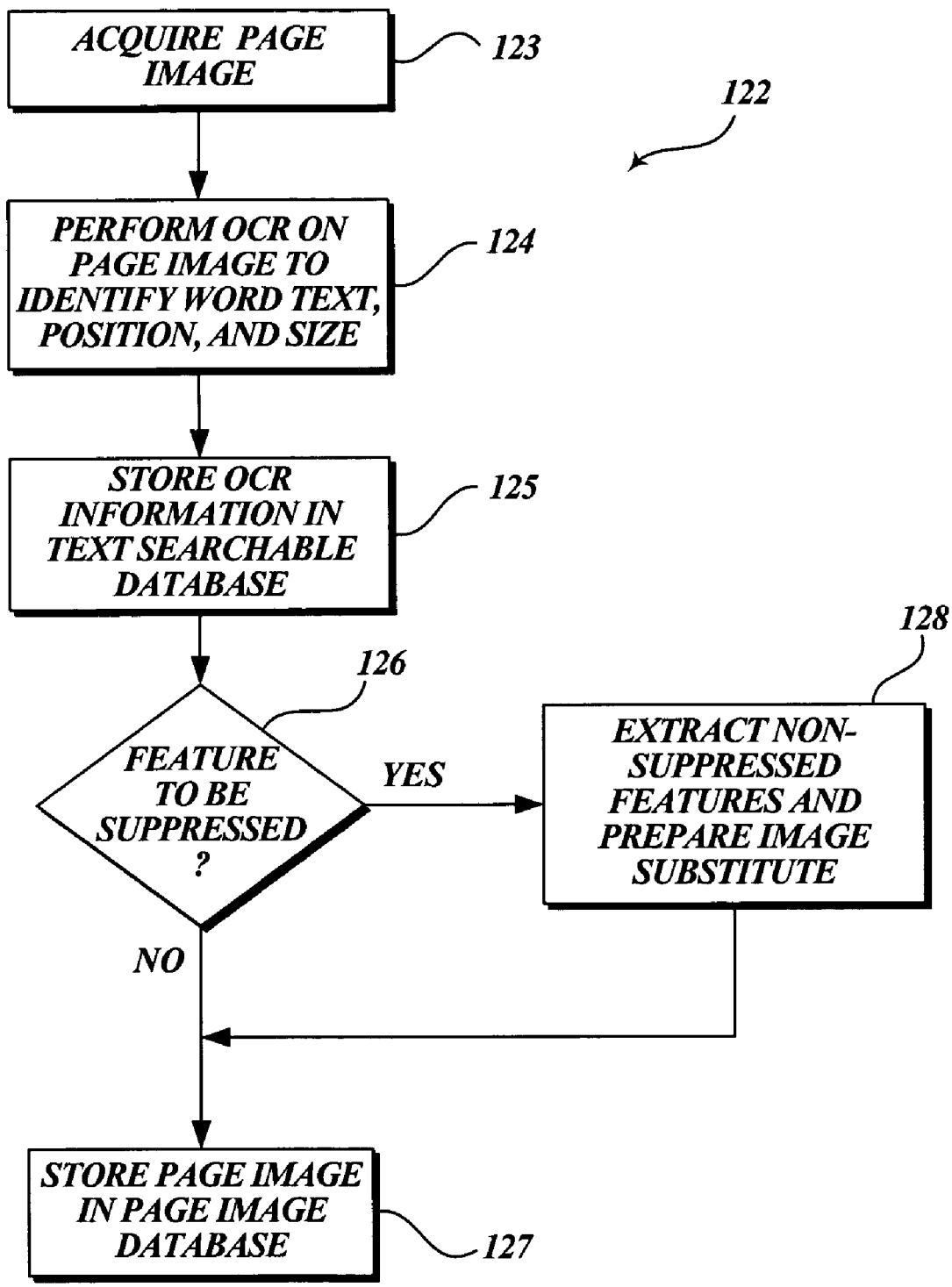
FIG. 3 is a flow diagram describing one embodiment of a process for preparing images of content and storing the images in a page image database, along with preparing and storing text of the content in a text searchable database.

One embodiment of a process 122 by which pages of content can be prepared and stored in the databases 116 and 118 is shown in FIG. 3. For each page of content to be included in the general library (from which different users' personal libraries may be defined) or in a user's personal library, images of each page of the content are acquired, as indicated at block 123. Image acquisition can be performed using methods known in the art, such as scanning printed pages, converting electronic text to document images, retrieving page images from memory, etc.

For each page of content, a recognition routine, such as an optical character recognition (OCR), may be performed on the page image as necessary to identify the text, position, and size of each word on the page, as indicated in block 124. It should also be understood that a "word" encompasses any grouping of one or more characters, numbers, or symbols. Moreover, a word may stand alone or be associated with a non-text object, such as a picture or graphic. OCR routines are well known in the art of electronic document processing and do not require further discussion herein. As indicated at block 125, the resulting text, position, and size information obtained from each page image is preferably stored in the text searchable database 118.

The text searchable database 118 may be organized as desired, preferably using data structures optimized for full text searching. In one suitable embodiment, each word in the text searchable database 118 has associated therewith content identification numbers (e.g., SKU numbers) and page numbers corresponding to images in the page image database 116 where the particular word is found. Furthermore, in association with each page image number, the text searchable database 118 preferably includes information that identifies the position and size of the text (and possibly non-text objects associated with the text) as found on the respective page image. In one implementation, the position and size information is recorded as "quads," which include four numbers representing the X and Y position and the width and height of the text as it appears on a particular page image. All of this information may be heavily encoded in the text searchable database 118 to reduce the storage space required.

A general library of content or personal library of content may be configured to include only that content for which the library owner has obtained valid rights to store, reproduce and distribute the content. Situations may arise in which a publisher of a book, for example, grants rights to a library owner to store and reproduce certain features as found in a book, but restricts the reproduction of one or more other features in the book, e.g., for copyright or contractual reasons. Such features may include, for example, photographs, graphics, charts, names, numbers, dates, formulae, equations, pictures, and other text or non-text objects, or portions thereof. Features may also be characterized by size, font, and/or location on a page image. For whatever reason the case may be, a process is provided in which features in a page image can be suppressed so that when the page image is displayed to a user (e.g., as a result of a search), only the non-suppressed features of the page image are displayed.

At decision block 126 in FIG. 3, the process 122 determines for a page image whether the page has one or more features to be suppressed. If no features need to be suppressed, the originally-acquired page image is stored in the page image database 116, as indicated at block 127, for later retrieval.

On the other hand, if one or more features in a page image are to be suppressed, the process 122 proceeds to extract the non-suppressed features in the page image, as indicated at block 128, in order to prepare a substitute image that omits the features to be suppressed. One example of feature extraction in this regard is described in reference to FIGS. 4-6. The resulting substitute page image is then stored in the page image database 116 in place of the originally-acquired page image, as indicated at block 127. In some circumstances, it may be permitted to separately store the original page image in anticipation of later receiving rights to reproduce more or all of the original page, including previously suppressed features. Alternatively, it may be permitted to store a "negative" version of the page image in which the non-suppressed features are removed, but all else (including the suppressed feature) remains. The original page image can be restored in this alternative case by combining both the "positive" and "negative" versions of the page image.

Figure 4:
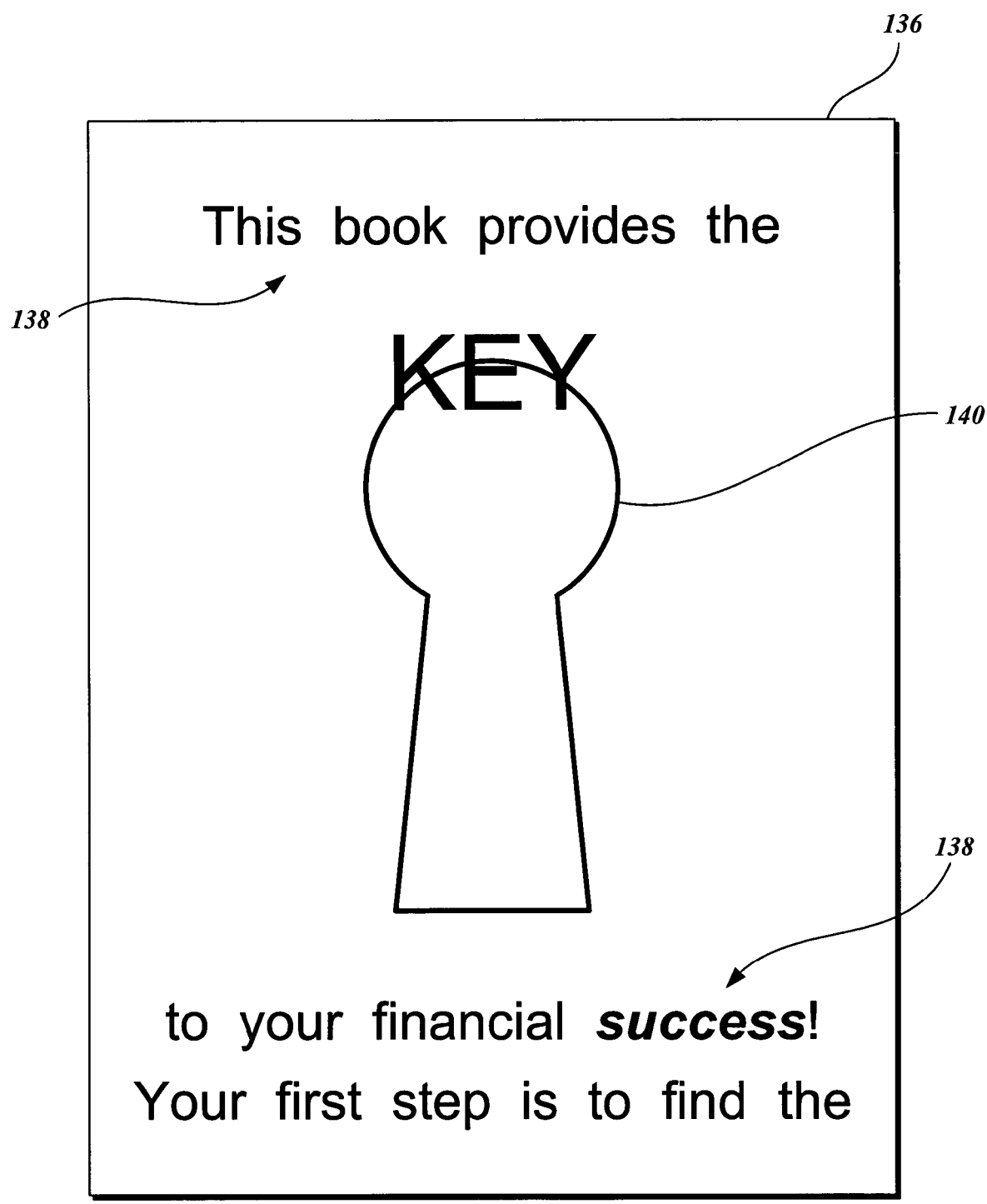
FIG. 4 is an example illustration of a page of content with text and a picture.
Figure 5:
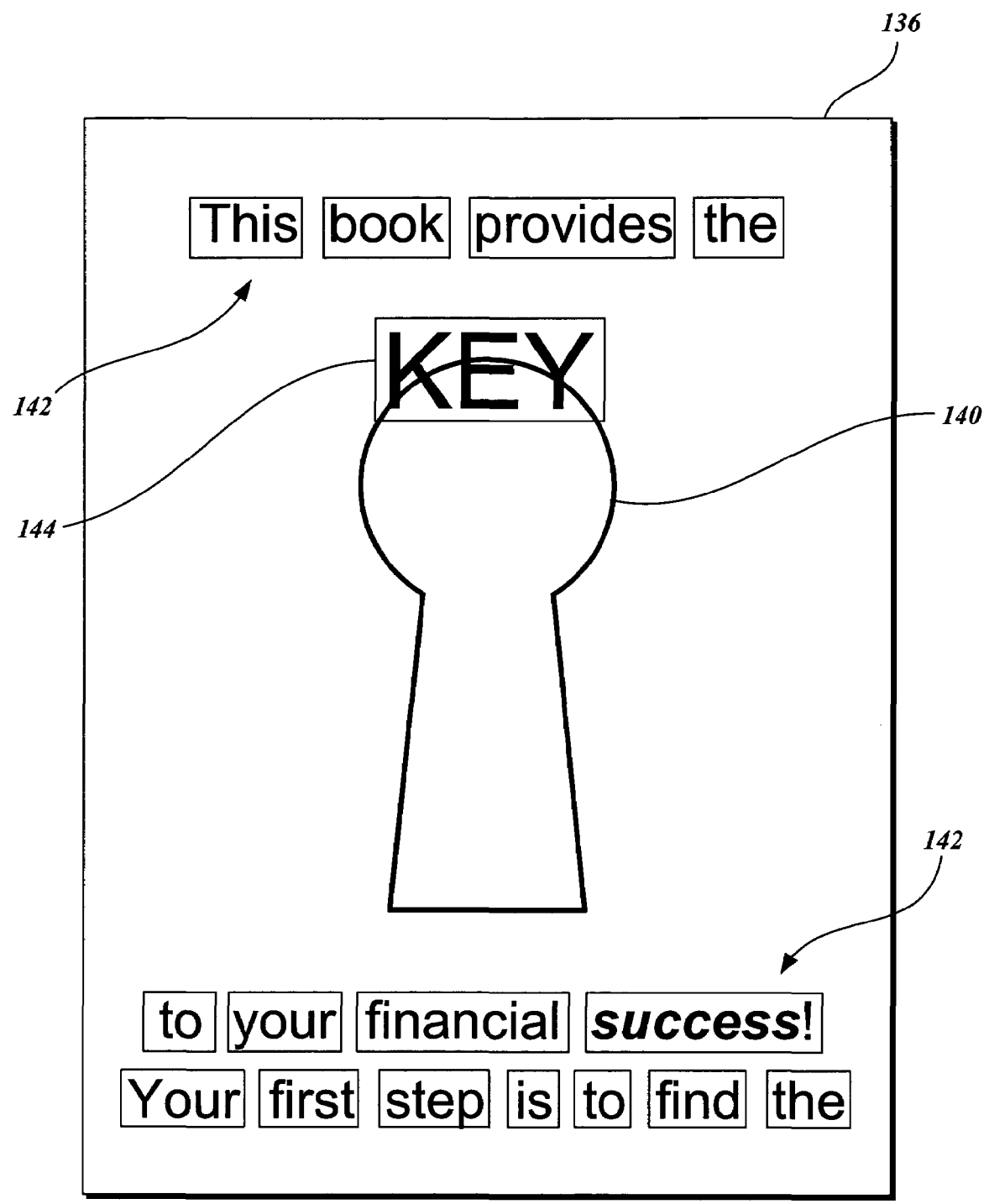
FIG. 5 illustrates the page shown in FIG. 4 with identified text shown in boxes.
Figure 6:
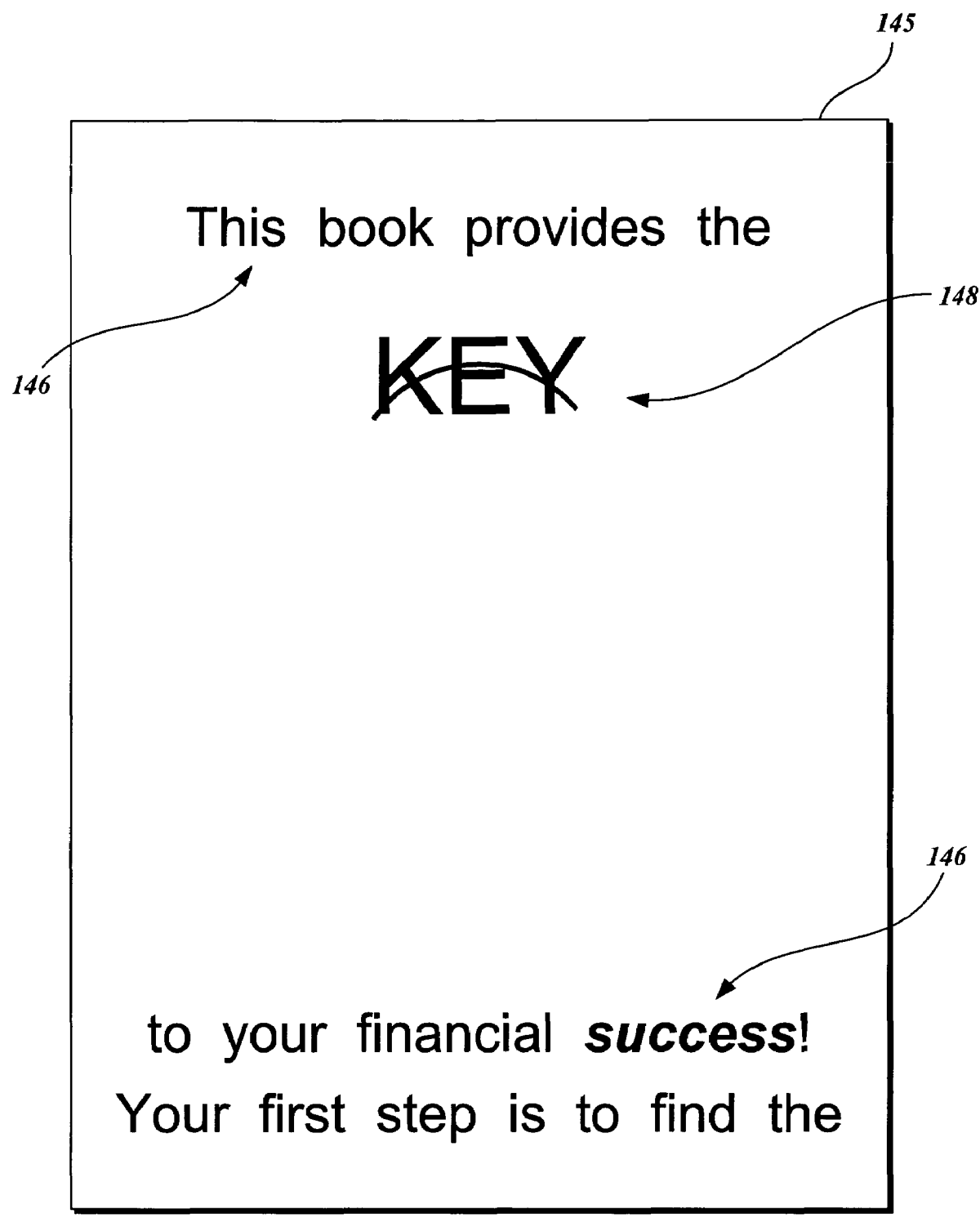
FIG. 6 illustrates a substitute page in which images of the text identified in FIG. 5 are copied and placed in the substitute page, thus effectively suppressing the picture in the original page shown in FIG. 4.

FIGS. 4-6 illustrate one exemplary process by which a feature (here, a picture) in a page image can be suppressed. FIG. 4 depicts a page image 136 that includes both text 138 and a picture 140. A first task in this process is to identify each word on the page image 136, as well as the location and size of each word. Conveniently, this can be achieved as part of the OCR process described earlier with respect to block 124 in FIG. 3. OCR approximation can also be used in this regard, which is often faster and can be conducted in real time as opposed to typical OCR where each character of each word is independently and correctly recognized. OCR approximation returns the location and size of words, but does not necessarily recognize each individual character correctly. FIG. 5 illustrates the page image 136 in which each of the words on the page have been located and identified, as represented by the boxes surrounding each word indicated by reference numeral 142. The word indicated at numeral 144 has also been located and identified, but the word 144 is separately noted herein because the background of the word includes a small portion of the picture 140.

Turning to FIG. 6, a substitute image 145 for the page image 136 is prepared by generating a blank image and then copying information for each identified word, such as pixel information, from the original page image 136 to the substitute image 145, as indicated generally by reference numeral 146. The words are placed on the substitute image 145 at the respective location that each word is found in the original image 136. By "cutting" only the pixel information for each word as contained in the boxes surrounding the words in FIG. 5, and "pasting" the pixel information in the substitute image 145, the picture 140 in the original image 136 is effectively suppressed. When the pixel information for the word image 144 is copied into the substitute image 145, as shown at reference numeral 148, the small part of the picture behind the word 148 may remain visible in the substitute image 145, though the picture 140 as a whole cannot be recognized. If desired, algorithms known in the art may be applied to the word image 144 to eliminate the background behind the letters. In any case, the amount of the picture 140 behind the word 148 represents only a small fraction of the original picture 140. In an alternative embodiment, a substitute image that suppresses a picture may be prepared by first identifying words in the original page image 136, e.g., as shown in FIG. 5, and then "erasing," or removing, all the pixel information in the page image outside the "boxes" that surround the identified words. The effect is the same as cutting and pasting the word images into a new (substitute) page image.

In some cases, the original page image 136 may have a background texture or color that is desired to be reproduced in the substitute image 145. One suitable method for preparing a substitute image 145 with a background similar to that of the original image 136 is to inspect one or more pixels in one or more corners of the original image 136 and reproduce the color and intensity of those pixels in the respective corners of the substitute page 145. The color and intensity from each corner may then be interpolated inward to the center of the page to complete a background for the substitute page 145 that simulates the background of the original image 136. In the alternate embodiment above, where pixel information outside the "boxes" is "erased," the pixel information may be differentiated between foreground pixel information and background pixel information with only the foreground pixel information being erased, leaving the background information in its place.

Feature suppression can vary depending on the type of content involved and the restrictions imposed. For example, a publisher of a recipe book may allow an ingredient list for a recipe to be shown to a user but not the amount of ingredients. Using OCR techniques, numbers such as "5" and "five," for example, can be identified and suppressed, as well as fractions, using one of the feature suppression methods described above. Allowing a user to see an ingredient list (and perhaps the cooking instructions) allows the user to identify desirable recipes. The user may then seek to acquire the entire recipe, e.g., by electronic download or printed recipe book purchase. Similar procedures may be used by publishers of technical treatises or texts where numbers and/or equations are central operative features of the texts. Although the numbers and equations may be suppressed, the user is afforded an opportunity to view surrounding text and at the same time may be invited to purchase the text to view the operative numbers or equations. Different classes of information may thus be suppressed from the page images that are stored in the page image data base 116 and/or shown to the user. Suppression of a picture, as illustrated in FIGS. 4-6, is just one example of a class of information capable of suppression. Feature suppression may be performed prior to storing a (substitute) page image in the page image database or after retrieval of a page image from the database but before the page image is displayed to the user.

Figure 7:
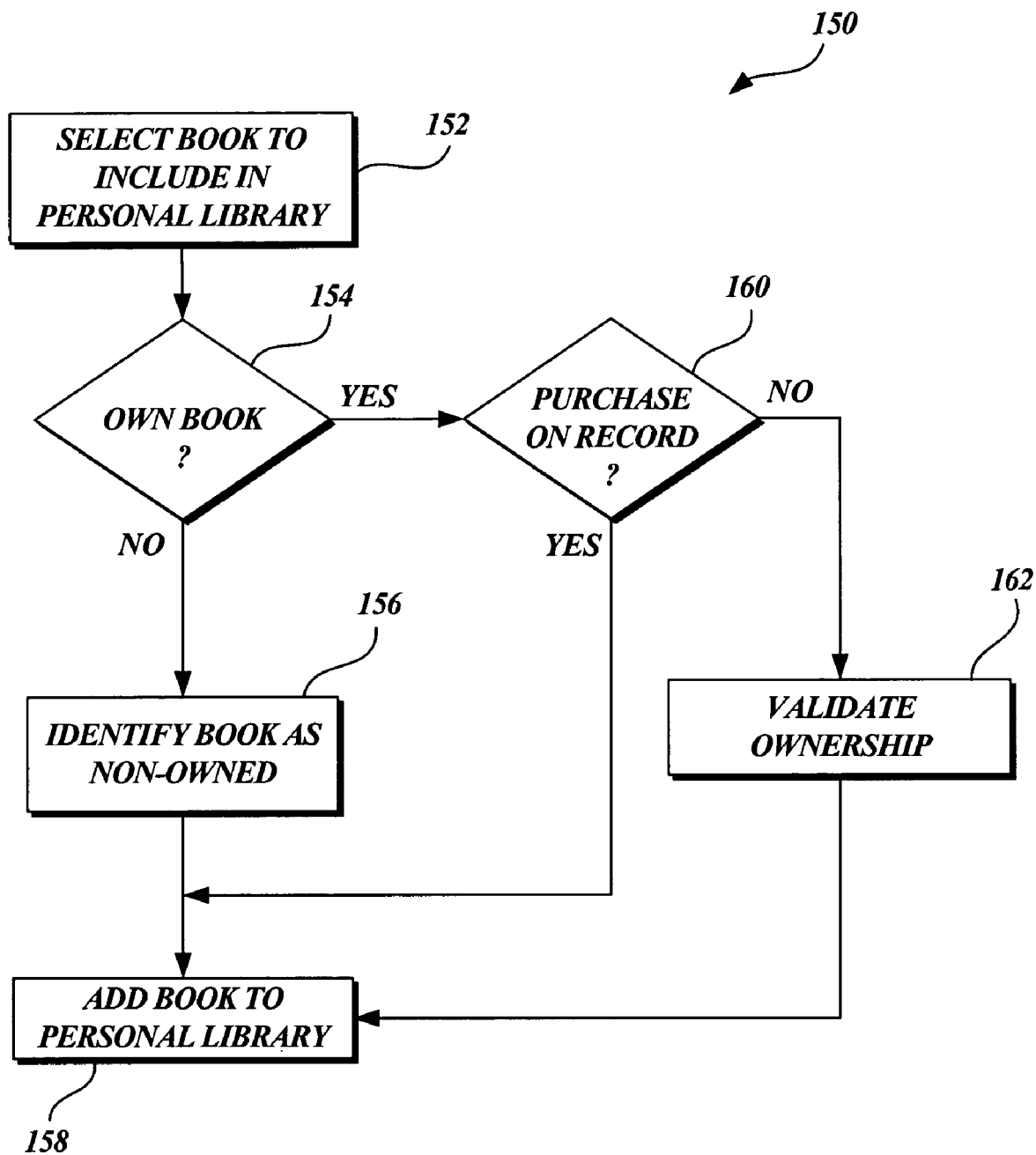
FIG. 7 is a flow diagram describing one embodiment of a process that enables a user to select and add content to be included in the user's personalized library.

Turning now to FIG. 7, a process 150 is described by which a user may establish or update a personal library of content that is selected from a general library of content, as stored in a page image database 116 and text searchable database 118. As a first step 152 in the process 150, the user selects content from the general library and includes this content (or electronic link thereto) in the user's personal library. By way of example only, the content described in FIG. 7 is in the form of a book, though the invention applies to other forms of content. As discussed earlier, in one embodiment, user-selection of content for a personal library may be accomplished by permitting the user to review an index of the content in the general library and manually select particular content (in this example, a book) to include in the user's personal library. For each selection at block 152, the process 150 determines at a decision block 154 whether the user owns the book. If the user does not own the book, the particular book is identified as non-owned by the user, as indicated at block 156, and added to the user's personal library, as indicated at block 158. Non-ownership of a book in a user's personal library may be indicated by an electronic flag associated with the book in the personal library.

Returning to decision block 154, if the user indicates that he or she owns the book, the process 150 attempts to confirm the user's ownership. In circumstances where the personal library searching service is provided by an entity that sells books, the entity may review its purchase information for the user to confirm that, in fact, the user owns the book, as indicated at reference numeral 160. The personal library searching service may also have partner agreements with other booksellers that can confirm purchase records for a user. Reviewing the user's purchase records may further be done automatically for books selected by the user in block 152, without querying the user whether he or she owns the book. Alternatively, a user's selection of a book for purchase may act to automatically add the book to the user's personal library. In any regard, if the user's purchase of the book is confirmed, the process 150 proceeds to add the book to the user's personal library, as indicated at block 158. A flag may be associated with the book in the personal library to indicate that ownership of the book has been confirmed. After a book (or other content) has been added to the user's personal library, the user may choose to store the personal library in a computer memory for later retrieval. If desired, the search system 100 may be configured to allow a user to establish and/or update multiple personal libraries in the computer memory.

If ownership of the book cannot be confirmed by reference to a purchase record or other data source for validation of ownership, the process 150 may ask the user to undergo additional steps to validate ownership of the book, as indicated at block 162. The user, for example, may be asked to submit copies of receipts evidencing purchase of the selected book. Alternatively, or in addition, the user may be asked to provide an image of one or more pages from the selected book to validate ownership of the book. In some circumstances, it may be sufficient for the user to indicate the party from whom the book was purchased, and the provider of the personal library searching service can independently confirm with the identified seller that in fact a purchase of the book had been made. A determination of ownership of content selected for a personal library is not critical or necessary to the invention, but is helpful in circumstances where the amount and scope of content displayed to a user in a search is restricted in accordance with established ownership of the content.

As noted earlier, the database server 110 may include an access rights database 120 that controls the scope and nature of the content that is displayed to a user as a result of a search. The access rights database 120 includes access rules that, when determined to be applicable, act to limit the content in the page images that are shown to the user. Limitations on viewing content may be established for each individual user (or groups or types of users), and may include, but are not limited to, one or more of the following: limits on the amount (e.g., percentage) of content that can be shown to the user for any given page, title, or collection of content, limits on the total number of pages that can be shown for any given title or collection of content, limits on the amount of content based on type of content, limits on the total number of pages that can be shown to a user independent of content-specific limitations, and limits on the total number of pages that can be shown to the user for any given search result. These limits may be imposed on a per search basis or in the aggregate for all of the searches conducted by the user. These limits may also be imposed for specified time periods. For example, access rules may be written such that a user may not see more than a specified percentage of a given page of content in a specified time frame, such as a 30-day time period, or 10 days in a 30-day cycle, or over the lifetime of the user.

Access rules may also serve to define the amount of content that can be provided to the user based on an identification of the user. A log in or registration routine may be employed to identify a user. The library content search system 100 may implement user verification procedures to inhibit users from establishing multiple accounts to circumvent access limitations in the access rights database 120. For example, entry of a valid credit card number may be required for verification of user identification. The search system 100 may further be set up to permit users to view content that is located only as a result of a search. In other words, the user is not permitted to access and view arbitrary pages, for example, in a browse mode (though the user may be able to browse one or more pages adjacent a page located in a search to give context to the located page). To carry out limitations such as these, the search system 100 may be configured to track user activity for each user, including the identity of the page images (or portions thereof) that the user has viewed and the time frame in which the user has viewed the page images.

Access rules in the access rights database 120 may further be configured to apply differently for each individual user (or groups of users) depending on content-specific information, such as the type of content at issue. For example, access rules may be written to permit unlimited viewing of tables of content and indexes of content but impose stricter limitations on viewing the body of the content itself.

User location can also act as a factor that determines which access rules govern a user's access to content at the time the content is produced for display to the user. For instance, different access rules may be written to enable a student in a classroom to access an entire body of content that is being used in the class, while the same student, at home, is only able to view a limited portion of the content. The domain of computer connection, for example, may be used to determine user location. Access rules may be written to apply differently based on the time the content is to be provided to the user, e.g., on different days or at different times of day, as well. Access rules may also be prepared and stored in the access rights database 120 so that once a portion of a page image has been displayed to a user, the user can always come back to view that portion, without impacting other limits on viewing new page images. In any event, the access rules may be written in programming code that a computer can interpret and execute to implement the access rules. Systems for writing and executing such code are known in the art of computer programming.

The personal libraries of users need not duplicate the actual content stored in the general library. Rather, each user's personal library may be comprised of a listing of the content that the user has selected from the general library to include in his or her personal library. This personal listing of content may link to the actual content stored in the database server 110. By limiting the number of actual copies of the content in the database server 110, and allowing users' personal libraries to link to that content, the amount of storage space required for implementing a personal library searching service is reduced. Furthermore, providing a general library of content that is publicly accessible to users for defining personal libraries reduces or removes from users the burden of scanning content and creating searchable electronic copies of content for their personal libraries, not to mention obtaining legal clearance to produce copies of content, where such is necessary.

A user that has established and/or updated a personal library is able to electronically search the personal library, e.g., for content having text that matches one or more search terms provided by the user. A search conducted in this manner has significant advantages including (1) limiting the user's search to the particular content in the user's personal library; (2) conducting a full text search that encompasses the entire body of content in the user's personal library which is more comprehensive than a search encompassing only bibliographic and abstract data or metadata associated with the content; and (3) producing for immediate review by the user the actual images or portions of images of content resulting from the search. Additional advantages are evident from the description herein.

Figure 8:
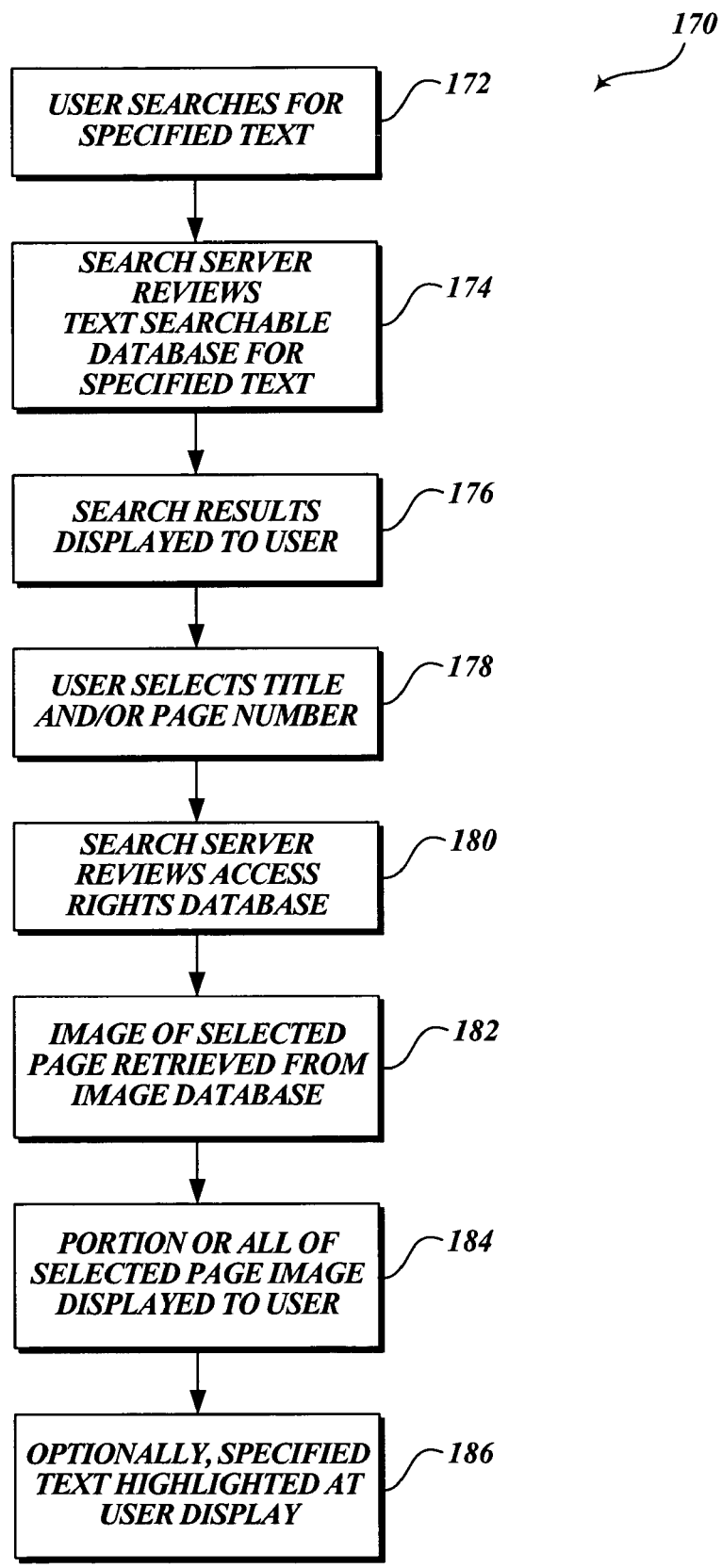
FIG. 8 is a flow diagram describing one embodiment of a process for searching and displaying content in the user's personalized library.
Figure 9:
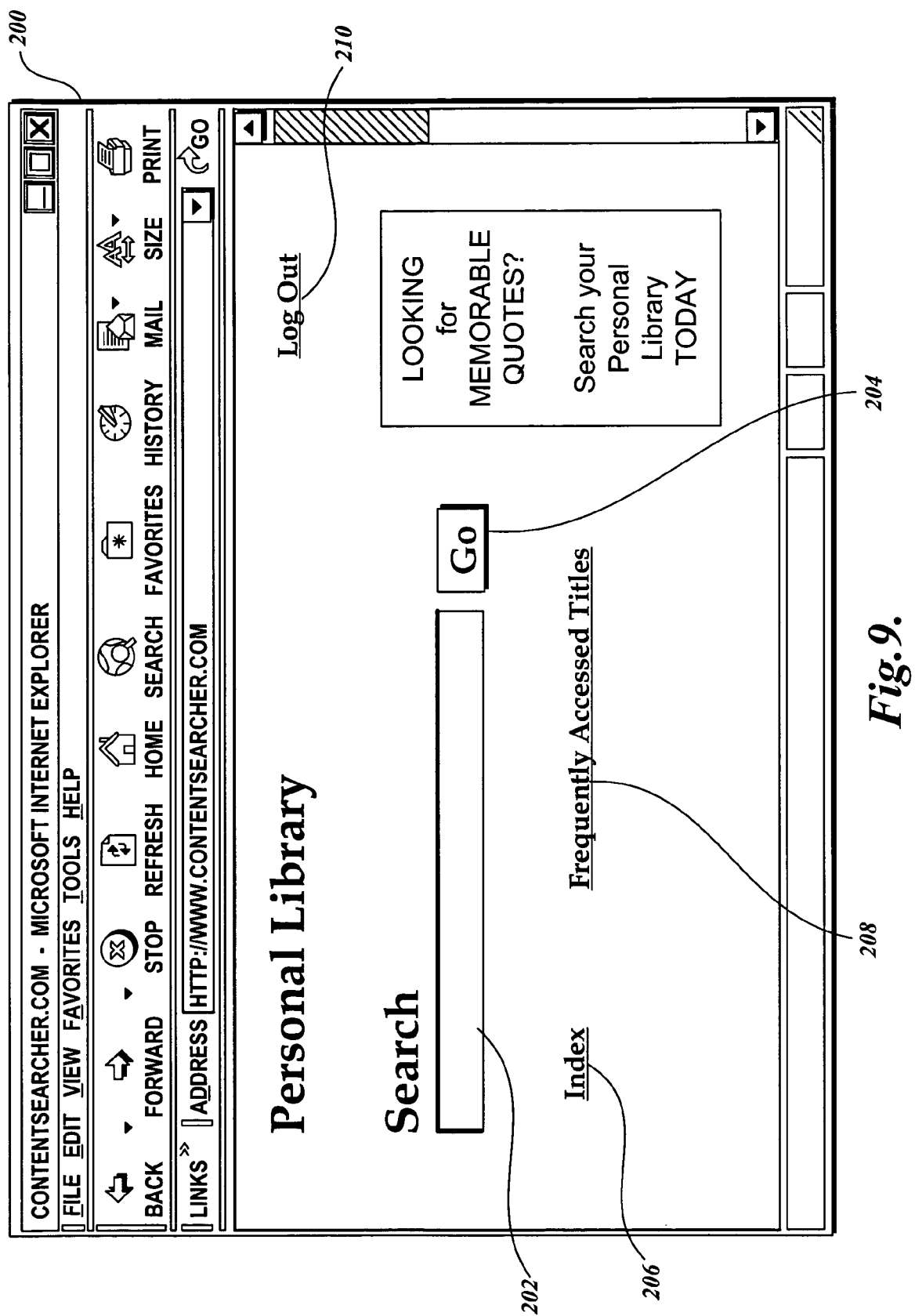
FIG. 9 depicts a browser program with an example Web page presenting a search input field to a user.

One embodiment of a process 170 for searching and viewing content in a personal library is described in reference to FIG. 8, with further reference to FIGS. 9-12. In FIG. 8, at block 172, a user initiates a search for specified text in the content in the user's personal library. In a Web-based implementation, one example of a Web page provided to the user for searching a personal library is illustrated in FIG. 9.

FIG. 9 illustrates a browser program 200 displaying a Web page in which the user is able to enter one or more search terms in a search entry box 202. The Web page may be generated by the search server 108 and delivered to the user's computing device 102, 104 via the Internet. The user enters the desired search terms in the box 202 and uses a pointing device, keyboard, or other input device to initiate the search, e.g., by clicking on the button "GO" identified at reference numeral 204. The Web page in FIG. 9 may include other hypertext links, such as an "Index" link 206 and "Frequently Accessed Titles" link 208, both providing additional information that can be assembled into one or more additional Web pages not illustrated. Clicking on the Index link 206 for example, may produce a Web page for the user that lists bibliographic data for all of the content presently included in the user's personal library. The Frequently Accessed Titles link 208 may produce, for example, a listing of the content most frequently accessed by the user.

Log in and log out routines may be employed by the search server 108 to provide users with secure access to their personal libraries. Suitable routines for verifying a user requesting access to a personal library (e.g., using a password) are well known in the art. In FIGS. 9-12, it is assumed the user has already logged in. A Log Out link 210 is illustrated and, when initiated, enables the user to discontinue the user's current session and log out of his or her account.

Returning to FIG. 8, at block 174, the search server 108 receives the user's specified search terms and initiates a search of the text searchable database 118 to identify the pages of content in the user's personal library that include the text of the search query. As noted earlier, the text searchable database 118 is preferably constructed to include information that identifies the corresponding images in the page image database 116 where the search terms can be found. Thus, when conducting a user search for specified terms, the text searchable database 118 not only identifies the particular content in the user's personal library that contains the specified text, but also identifies the corresponding page images in the page image database 116.

Figure 10:
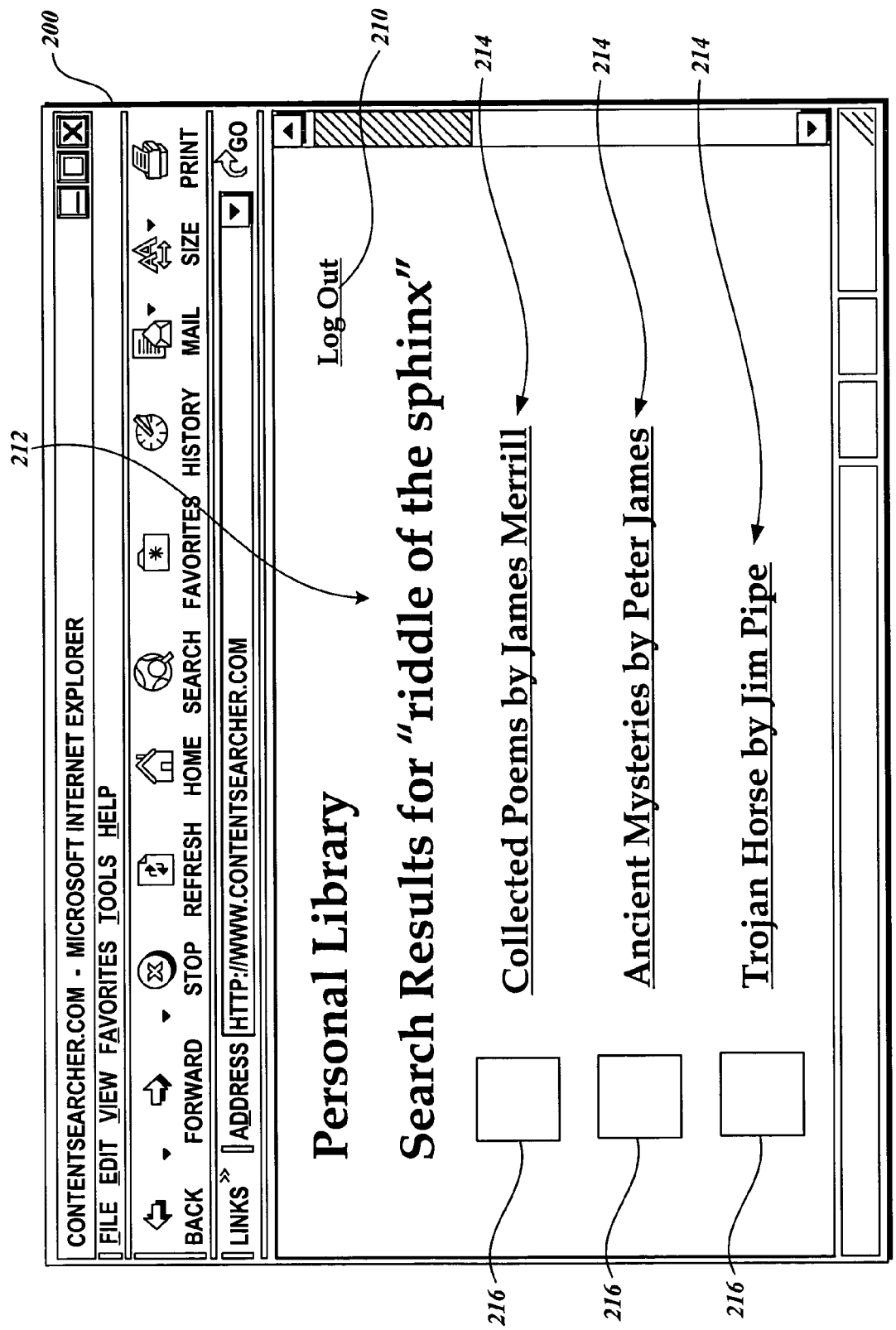
FIG. 10 depicts a browser program with an example Web page presenting results of a sample search.

The results of the user's search performed in block 174 are displayed to the user, as indicated at block 176. FIG. 10 illustrates the browser program 200 displaying a Web page in which search results for a sample phrase "riddle of the sphinx" are shown at reference numeral 212. The search results 212 may be displayed in a variety of different formats. By way of example only, the search results 212 in FIG. 10 include a listing of title and author, as indicated at reference numeral 214, along with thumbnail images of the content, or portion thereof (such as a book cover), as indicated at reference numeral 216. Again, the search results 212 are generated from a search of the content selected by the user to be included in the user's personal library. In cases where there are numerous search "hits" in the user's personal library, the search server 108 may execute program instructions that analyze the hits and rank the "best" pages for display to the user according to a predetermined criterion, such as which pages are most relevant. Measures of relevance, for example, may include which pages have the most hits, which pages have hits in their title, which pages are drawn from best selling texts, etc.

Returning to FIG. 8, at block 178, the user may select particular content in the search results, e.g., identified by title and/or page number, for additional review. The search server 108 may immediately display images of the user-selected content to the user. However, in the embodiment shown in FIG. 8, the search server 108 at block 180 first reviews the access rights database 120 in the database server 110 to determine whether there are any access rules governing how much of, or even if, the content listed in the search results can be displayed to the user. As previously discussed, the access rights database 120 is a repository for rules that control the ability of users to access and view the actual content in the library, e.g., beyond standard bibliographic information.

For instance, as noted earlier, different rules may be written to govern a user's access to content that is already owned by the user, as opposed to content not owned by the user. For user-owned content that is identified in the search results, the user may be permitted to access the entire body of that content including page images that precede or follow the pages on which the user's search terms are located. This includes, for example, operating manuals for products that the user has purchased.

Figure 11:
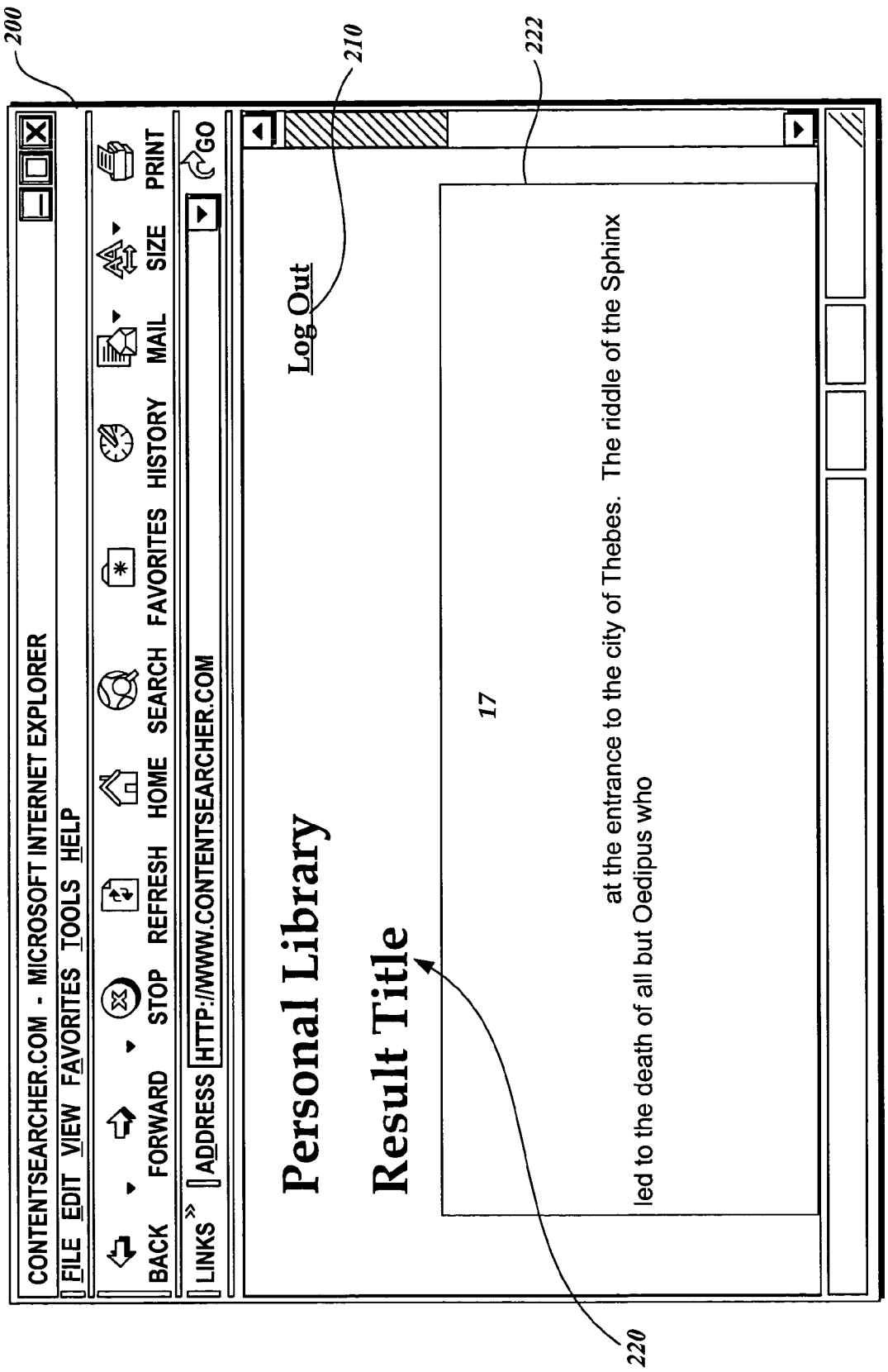
FIG. 11 depicts a browser program with an example Web page showing an image of a page from a selected search result.
Figure 12:
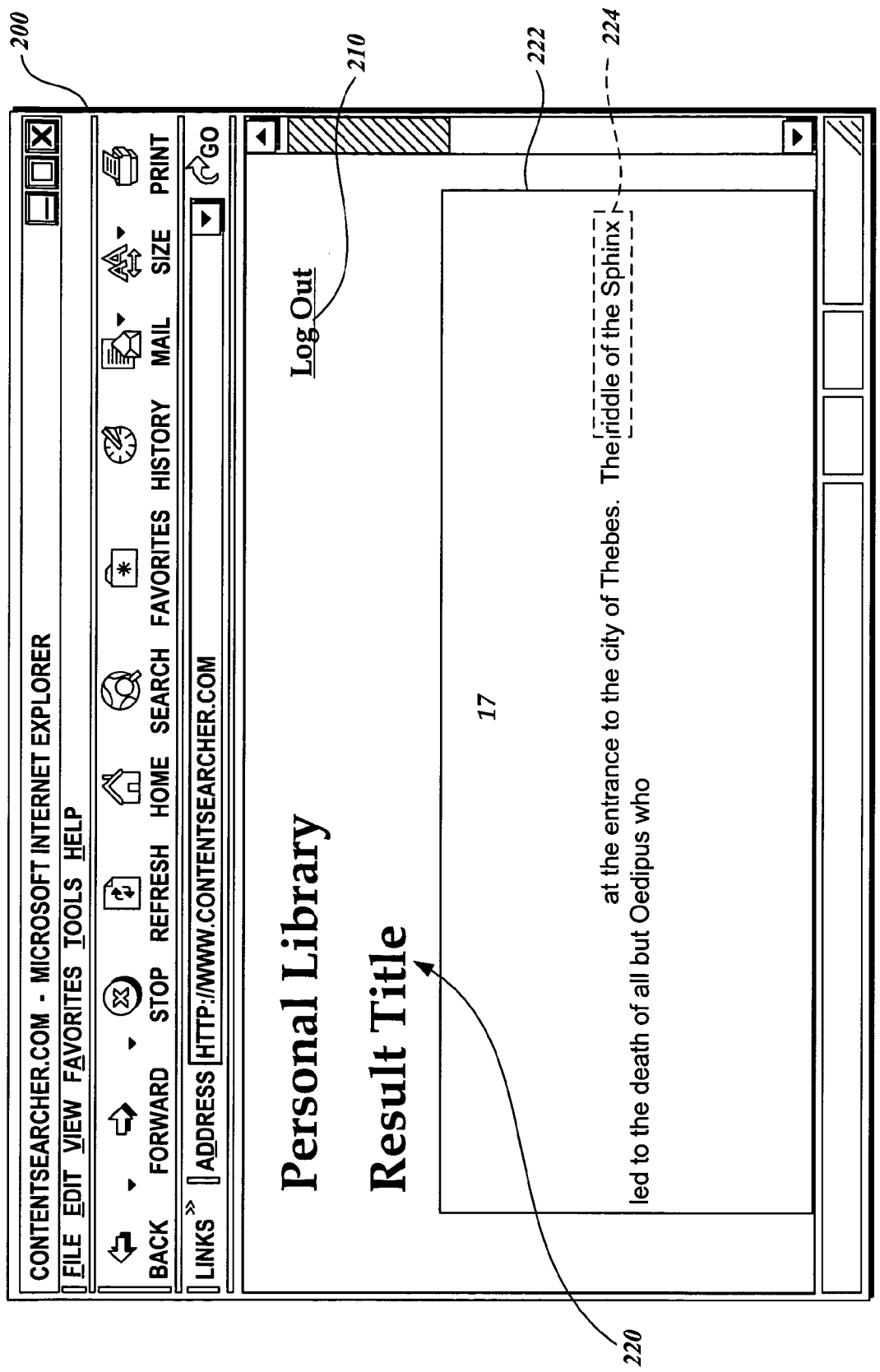
FIG. 12 depicts a browser program with a Web page as shown in FIG. 11 in which the search result is highlighted in accordance with the present invention.

For content that the user does not own, one or more rules in the access rights database 120 may act to limit the amount of content surrounding the located search terms that may be displayed to the user. For example, FIG. 11 illustrates a browser program 200 displaying a Web page for a particular title in the search results previously communicated to the user, such as shown in FIG. 10. The title of the search result, indicated at reference numeral 220, may be any of those in the search results 212, for example.

A sample page image 222 from the selected result title 220 is depicted in FIG. 11. The page image 222, in this instance, is an image of "page 17" from the result title 220 but does not include all of the content of the original page image. This redaction, or suppression, of content can be the result of a circumstance in which a user has limited access rights to the actual content of the result title 220. In this example, based on a search for the phrase "riddle of the sphinx" as shown in FIG. 10, the resulting page image 222 shows the actual page where the phrase "riddle of the Sphinx" is found, along with a limited number of words preceding and following the search terms. All other words and features on the page image 222, except for the page number, are suppressed. The number of words preceding and following the located search terms may vary according to user preferences and the access rules governing the particular content for the user. In this illustration, nine words are shown preceding and following the phrase "riddle of the Sphinx." In other circumstances, the access rules in the access rights database 120 may permit the user to view a greater portion or even the entire image of "Page 17" (i.e., page image 222) in FIG. 11. Methods for feature suppression described earlier may be used to suppress content in the page image to be displayed in accordance with the access rules in the access rights database.

In short, returning to FIG. 8, after a user has selected particular content from the search results 212 (block 178) and the access rights to the content have been considered (block 180), the image of one or more pages with text corresponding to the search terms are retrieved from the page image database (block 182). Based on the access rights granted to the user, a portion or all of a retrieved page image is displayed to the user (block 184).

Optionally, search terms specified by a user may be highlighted in the page images displayed to the user, as indicated at block 186. The present invention provides a process by which search terms may be highlighted in a manner that reduces the time and resources required for delivering the page image to the user for display.

Rather than formatting a page image 222 with highlighting of search terms at the search server 108 and then delivering the highlighted page 222 to the user, an embodiment of the present invention may proceed to immediately deliver the page image 222 to the user. In the meantime, the search server 108 determines the position and size of the search terms on the page image 222 (information that may be available in the text searchable database 118 as discussed earlier) and delivers that information to the user. The user device 102, 104 may then locally execute program instructions to place a visual indicator on the page image 222 to highlight the location of the search terms. The visual indicator may be an icon placed next to or an underline placed under the search terms. Alternatively, the visual indicator may be a change of font of the search terms as displayed. In a preferred embodiment, the visual indictor is provided by one or more blocks of transparent color that overlay the search terms, thus creating the effect of a colored highlight 224 (FIG. 12) when the page image 222 is displayed. In the latter preferred embodiment, the user device 102, 104 may be instructed to use DHTML layering or Java script technology to cause the user device 102, 104 to produce the highlight 224 on the page image 222. By having the user device 102, 104 prepare and overlay the color highlight on the search terms, the only information that the search server 108 needs to communicate to the user device 102, 104 (as to highlighting) are the numeric "quads" for each word to be highlighted. As noted earlier, a quad is a set of four numbers that describes the X and Y position as well as width and height of a word on a particular page image. In another embodiment, only the X and Y position of search terms is communicated and a highlight of a standard thickness is layered over the search terms. Minimizing the amount of information that the search server 108 needs to communicate to the user device 102, 104 will reduce the amount of time that it takes to communicate from the search server 108 to the user device 102, 104.

A user's personal library can also be divided as desired into classes of works, such as fiction and nonfiction works, and within such classes, subdivided into subclasses such as mystery, adventure, history, reference, etc. Classes and subclasses of works may be predefined or customized by the user. By restricting searches to particular classes or subclasses of books in the user's personal library, the searches performed by a user may be more focused and helpful to the user. For example, a medical student may define a personal "medical" library in which full text searches of medical texts in the student's personal library are conducted. Furthermore, an algorithm that identifies "related" text may also be used to aid a user's selection of content for the personal library to include content that may not be strictly classified in a particular class but nonetheless be related to a class that the user desires to search. "Related text" algorithms are known in the art and may use dictionary definitions and synonyms of certain words, for example, to identify related content to include in the personalized library that is searched.

While preferred embodiments of the invention have been illustrated and described above, it will be appreciated that various changes can be made therein without departing from the spirit and scope of the invention. For example, the notion of a personal library may be extended from a single person to a small group of persons (constituting a "user"), that know each other and choose to pool the content that they own. A small group of this type may be comprised of family members or persons living in the same apartment or in the same fraternity, etc. Each person in the group can determine the content to be included in the group's personal library. A single searchable set of content is provided to the group. The search results may also be configured to report who in the group owns the book and who currently is in possession of the book.

The description of searching "text" herein can be extended to include searching non-text objects as well, such as pictures, graphs, etc. Searching non-text objects can be accomplished by searching data, such as visible text (e.g., legends or labels), hidden text, and/or metadata, that is associated with or otherwise describes the object at issue. The text searchable database 118 can be constructed to include such visible or hidden text or metadata, with position and size information pointing to the object in the page image at issue.

It should also be understood that providing to the user an image of a page of content does not necessarily imply providing an image having the same dimensions as the original page content. An image of a page of content can be any size and may be adjusted in size to more closely conform to the particular portion of content that the access rules (if any) permit for display. Accordingly, depending on the search terms and the pages of content at issue, a user may receive an image that is only half of the original page, or one paragraph from the page, etc., with the page image being displayed having dimensions that match the portion of the page that is shown.

The scope of the present invention should thus be determined, not from the specific examples described herein, but from the following claims and equivalents thereto.

The embodiments of the invention in which an exclusive property or privilege is claimed are defined as follows:

1. A method for electronically searching a user-personalized library of content, comprising:

(a) receiving one or more search terms from a user having an electronically-searchable personalized library of content, the personalized library including a text searchable database and a page image database;
(b) electronically searching the text searchable database for pages of content that match the search terms to produce search results;
(c) providing the search results to the user;
(d) receiving a search result selection from the user;
(e) preparing a substitute image of a page image in the page image database corresponding to the search result selection from the user, wherein a portion of the content in the page image is suppressed in the substitute image in accordance with one or more access rules to limit the amount of content in the substitute image;
(f) providing location information to the user that identifies the location of the search terms in the substitute image; and
(g) providing to the user the substitute image responsive to the user's search result selection such that a portion of the content in the page image is suppressed in the substitute image provided to the user with an instruction to highlight the search terms in the substitute image, wherein the instruction to highlight the search terms in the substitute image comprises an instruction to apply a layer of color on or near the search terms.

2. The method of claim 1, further comprising, prior to receiving one or more search terms from the user, establishing an electronically-searchable library of content that includes a page image database and a text searchable database, which library of content is personalized by the user to consist of content selected by the user.

3. The method of claim 2, in which the library of content is personalized by manual selection of content by the user.

4. The method of claim 2, in which the library of content is automatically personalized based on user selection of content for review or purchase.

5. The method of claim 2, in which a non-text object in the user's personalized library is made searchable by including text data related to the object in the text searchable database.

6. The method of claim 1, in which the user-personalized library of content is established at the time the user conducts the search.

7. The method of claim 1, in which the user's personalized library of content is derived from a publicly-accessible general library of content.

8. The method of claim 1, in which providing the search results to the user includes providing a list of content having pages with text that matches the search terms.

9. The method of claim 8, further comprising ranking the content in the list of content according to a predetermined criterion.

10. The method of claim 1, in which providing to the user an image of a page of content includes retrieving the page image from a database of page images stored in computer memory.

11. The method of claim 1, in which the user's personalized library is defined after electronically searching a general library of content using the search terms, the user's personalized library being fully contained within the general library of content and defining the scope of search results provided to the user.

12. The method of claim 1, wherein the instruction to highlight the search terms in the substitute image comprises one of an instruction to apply a layer of color on or near the search terms or an instruction to place a visual indicator next to the search terms.

13. The method of claim 1, in which the access rules define an aggregate amount of unsuppressed content that can be provided to the user over a time frame.

14. The method of claim 1, in which the access rules define a percentage of unsuppressed content that can be provided to the user over a time frame.

15. The method of claim 1, in which the access rules define the amount of unsuppressed content that can be provided to the user based on content-specific information.

16. The method of claim 1, in which the access rules define the amount of unsuppressed content that can be provided to the user based on user ownership of the content.

17. The method of claim 16, further comprising reviewing purchase records to validate user ownership of the content.

18. The method of claim 1, in which different access rules apply based on the location of the user.

19. The method of claim 1, in which different access rules apply based on the time the content is to be provided to the user.

20. The method of claim 1, in which the access rules define the amount of content that can be provided to the user based on an identification of the user.

21. A method for preparing a user-personalized library of content for electronic searching and delivery of content to a user, comprising:
(a) acquiring a general library of content that includes images and corresponding text of pages of content;
(b) preparing a page image database comprised of the images of pages of content;
(c) preparing a text searchable database comprised of the corresponding text of pages of content;
(d) receiving from a user a selection of content in the general library to form a user-personalized library of content that the user can electronically search using the text searchable database;
(e) identifying an image of a page of content in the page image database based on a search of the text searchable database;
(f) preparing a substitute image of the identified image, wherein the substitute image is modified from the appearance of the identified image to automatically suppress a portion of content of the identified image in accordance with one or more access rules to limit the amount of content in the identified image, such that when the substitute image is displayed, a portion of the content in the identified image is suppressed in the substitute image; and
(g) defining classes of content and assigning content in the user's personalized library to one or more of the classes, and limiting a search of the user's personalized library to content in a specified class.

22. The method of claim 21, in which the personalized library of content is comprised of content selected by a group of persons constituting a user, the method further comprising enabling persons in the group to conduct searches of the personalized library of content.

23. The method of claim 21, in which the user's selection of content in the general library is received based on manual selection by the user.

24. The method of claim 21, in which the user's selection of content in the general library is automatically received based on the user's review or purchase of the content.

25. The method of claim 21, further comprising storing the user-personalized library of content in a memory for later retrieval by the user.

26. The method of claim 25, further comprising enabling the user to store and retrieve multiple user-personalized libraries.

27. The method of claim 21, in which the user's selection of content in the general library is aided by providing the user with a list of content determined to be related to a subject content.

28. A computer system that provides electronic searching of a user-personalized library of content, comprising a processor, a search server in communication with a database server, in which the database server is configured with a general library of content that is accessible to multiple users, the general library including (1) a page image database containing images of pages of content, (2) an access rights database containing access rules that define the scope of content to be displayed to each user, and (3) a text searchable database containing text and identifying information indicating the page images in the page image database that contain the text, the search server being configured with a search engine comprised of computer-implemented instructions that enable the search server to:

(a) receive one or more search terms from a user having established a personalized library within the general library of content, (b) search the full text of the user's personalized library for pages of content that match the search terms, (c) provide the results of the full text search to the user for selection by the user, (d) prepare a substitute image of a page image in the page image database corresponding to the search result selection from the user, wherein a portion of the content in the page image is suppressed in the substitute image in accordance with one or more access rules to limit the amount of content in the substitute image, (e) provide location information to the user that identifies the location of the search terms in the substitute image, and (f) provide to the user the substitute image responsive to the user's search result selection with an instruction to highlight the search terms in the substitute image, wherein the instruction to highlight the search terms in the substitute image comprises an instruction to apply a layer of color on or near the search terms.

29. The computer system of claim 28, in which the access rules define an aggregate amount of unsuppressed content that can be provided to the user over a time frame.

30. The computer system of claim 28, in which the access rules define a percentage of unsuppressed content that can be provided to the user over a time frame.

31. The computer system of claim 28, in which the access rules define the amount of unsuppressed content that can be provided to the user based on content-specific information.

32. The computer system of claim 28, in which the access rules define the amount of unsuppressed content that can be provided to the user based on user ownership of the content.

33. The computer system of claim 32, in which the computer-implemented instructions further enable the search server to validate user ownership of the content by reviewing purchase records pertaining to the user.

34. The computer system of claim 28, in which different access rules apply based on the location of the user.

35. The computer system of claim 28, in which different access rules apply based on the time the unsuppressed content is to be provided to the user.

36. The computer system of claim 28, in which the access rules define the amount of unsuppressed content that can be provided to the user based on an identification of the user.

37. The computer system of claim 28, in which a non-text object in the User's personalized library is made searchable by including text data related to the object in the text searchable database.

38. The computer system of claim 28, in which the search server provides the search results in the form of a list of content having pages with text that matches the search terms, which content in the list of content is ranked according to a predetermined criterion.

39. The computer system of claim 28, wherein the instruction to highlight the search terms in the substitute image comprises one of an instruction to apply a layer of color on or near the search terms or an instruction to place a visual indicator next to the search terms.

* * * * *

UNITED STATES PATENT AND TRADEMARK OFFICE
CERTIFICATE OF CORRECTION

PATENT NO. : 7,496,560 B2 Page 1 of 1
APPLICATION NO. : 10/669088
DATED : February 24, 2009
INVENTOR(S) : U. Manber et al.

It is certified that error appears in the above-identified patent and that said Letters Patent is hereby corrected as shown below:

| COLUMN | LINE | ERROR |
|---|---|---|
| 18 (Claim 37, | 28 line 2) | "User's" should read --user's-- |

Signed and Sealed this

First Day of September, 2009

David J. Kappos
*Director of the United States Patent and Trademark Office*